(12) United States Patent
Thubert et al.

(10) Patent No.: US 8,724,533 B2
(45) Date of Patent: May 13, 2014

(54) MULTICAST SUPPORT BY MOBILE ROUTERS IN A MOBILE AD HOC NETWORK

(75) Inventors: Pascal Thubert, La Colle Sur Loup (FR); Bryan Michael McLaughlin, Rochdale (GB)

(73) Assignee: Cisco Technology, Inc., San Jose, CA (US)

( * ) Notice: Subject to any disclaimer, the term of this patent is extended or adjusted under 35 U.S.C. 154(b) by 1278 days.

(21) Appl. No.: 11/714,884

(22) Filed: Mar. 7, 2007

(65) Prior Publication Data

US 2008/0219237 A1  Sep. 11, 2008

(51) Int. Cl.
H04H 20/71 (2008.01)

(52) U.S. Cl.
USPC .............. 370/312; 370/390; 370/408

(58) Field of Classification Search
USPC .............. 370/338, 315–238, 254–256, 312, 370/315–328, 351–356, 390, 392, 400–401, 370/408, 432; 709/238, 252
See application file for complete search history.

(56) References Cited

U.S. PATENT DOCUMENTS

| | | | | |
|---|---|---|---|---|
| 7,310,335 | B1 * | 12/2007 | Garcia-Luna-Aceves et al. ............................. | 370/390 |
| 2004/0032852 | A1 | 2/2004 | Thubert et al. | |
| 2004/0057440 | A1 | 3/2004 | Thubert et al. | |
| 2004/0190542 | A1 * | 9/2004 | Ono et al. ....................... | 370/432 |
| 2005/0180447 | A1 | 8/2005 | Yu-Jin et al. | |
| 2005/0265259 | A1 * | 12/2005 | Thubert et al. ................. | 370/255 |
| 2006/0227724 | A1 | 10/2006 | Thubert et al. | |
| 2006/0250999 | A1 | 11/2006 | Surong et al. | |
| 2006/0291404 | A1 | 12/2006 | Thubert et al. | |

OTHER PUBLICATIONS

U.S. Appl. No. 11/391,361, Thubert, Mar. 29, 2006.
"IPv6 Multicast At-A-Glance", Cisco Systems, 1 page.
Baker, "An outsider's view of MANET" <draft-baker-manet-review-01>, Network Working Group, Internet Draft, Mar. 17, 2002, pp. 1-39.
Handley et al, "Bi-directional Protocol Independent Multicast (BIDIR-PIM)", <draft-ietf-pim-bidir-09.txt>, Internet Engineering Task Force, Internet Draft, Feb. 22, 2007, pp. 1-45.
Wakikawa et al., "MANEMO Problem Statement" <draft-wakikawa-manemo-problem-statement-00>, Internet Draft, Feb. 5, 2007, pp. 1-33.
Wakikawa, "Home Agent Distribution towards the Unwired Internet", Keio University Faculty of Environmental Information, Joint Advanced Networking Workshop on IPv6, Nov. 23-25, 2006, pp. 1-17.

(Continued)

Primary Examiner — George Eng
Assistant Examiner — Marcus Hammonds
(74) Attorney, Agent, or Firm — Leon R. Turkevich

(57) ABSTRACT

In one embodiment, a mobile router receives a multicast-supported router advertisement message from an attachment mobile router in a mobile ad hoc network, the multicast-supported router advertisement message specifying an attachment prefix and a multicast-capable identifier. The mobile router attaches to the attachment mobile router in response to the multicast-supported router advertisement message and according to a protocol requiring establishment in the mobile ad hoc network of a tree topology having a single multicast clusterhead, and selects a default attachment address within an address space of the attachment prefix. The mobile router receives a multicast request, from an attached node, for receiving a multicast stream, and the mobile router outputs a neighbor advertisement message with multicast extension, to the attachment router, that specifies that access to the multicast stream is requested via the default attachment address.

24 Claims, 7 Drawing Sheets

(56) References Cited

OTHER PUBLICATIONS

Narten et al., "Neighbor Discovery for IP Version 6 (IPv6)", Network Network Working Group, Request for Comments: 2461, Dec. 1998, pp. 1-93.

Deering et al., "Multicast Listener Discovery (MLD) for IPv6", Network Working Group, Request for Comments: 2710, Oct. 1999, pp. 1-22.

Droms et al., "Dynamic Host Configuration Protocol for IPv6 (DHCPv6)", Network Working group, Request for Comments: 3315, Jul. 2003, pp. 1-101.

Cain et al., "Internet Group Management Protocol, Version 3", Network Working Group, Request for Comments: 3376, Oct. 2002, pp. 1-53.

Hinden et al., "Internet Protocol Version 6 (IPv6) Addressing Architecture", Network Working Group, Request for Comments: 3513, Apr. 2003, pp. 1-26.

Johnson et al., "Mobility Support in IPv6", Network Working Group, Request for Comments: 3775, Jun. 2004, pp. 1-165.

Savola et al., "Embedding the Rendezvous Point (RP) Address in an IPv6 Multicast Address", Network Working Group, Request for Comments: 3956, Nov. 2004, pp. 1-18.

Devarapalli et al., "Network Mobility (MENO) Basic Support Protocol", Network Working Group, Request for Comments: 3963, Jan. 2005, pp. 1-33.

Fenner et al., "Protocol Independent Multicast—Sparse Mode (PIM-SM) : Protocol Specification (Revised)", Network Working Group, Request for Comments: 2362, Aug. 2006, pp. 1-150.

Holbrook et al., "Source-Specific Multicast for IP", Network Working Group, Request for Comments: 4607, Aug. 2006, pp. 1-19.

Fenner et al., "Protocol Independent Multicast—Sparse Mode (PIM-SM): Protocol Specification (Revised)", Network Working Group, Request for Comments: 4601, Aug. 2006, pp. 1-150.

Thubert et al., "Network in Node Advertisement", <draft-thubert-nina.00-txt, IETF Standard Working Draft, Internet Engineering Task Force, Feb. 26, 2007, pp. 1-31.

Zhang et al., "Dynamic proxy tree-based data dissemination schemes for wireless sensor networks", *Wireless Networks*: The Journal of Mobile Communication, Computation and Information, Kluwer Academic Publishers, DO, vol. 13, No. 5, May 8, 2006, pp. 583-595.

* cited by examiner

MULTICAST SUPPORT BY MOBILE ROUTERS IN A MOBILE AD HOC NETWORK

TECHNICAL FIELD

The present disclosure generally relates to mobile routers in a mobile ad hoc network providing multicast support to mobile hosts subscribing to multicast traffic streams originating either within the mobile ad hoc network or from a wide area network (e.g., to the Internet) reachable by at least one of the mobile routers via an access router.

BACKGROUND

The Internet Engineering Task Force (IETF) Request for Comments (RFC) 3775 describes Mobile IP for a mobile host, and RFC 3963 describes network mobility (NEMO) for a mobile network having at least one mobile router providing access for the mobile network to a wide area network such as the Internet. A mobile ad hoc network (MANET), according to the IETF MANET Working Group, is an autonomous system of mobile routers (and associated hosts) connected by wireless links—the union of which form an arbitrary graph. Since the mobile routers in a MANET are free to move randomly and organize themselves arbitrarily, the wireless topology of the MANET may change rapidly and unpredictably.

The IETF also is investigating a mobile ad hoc network formed between mobile routers providing network mobility (NEMO), also referred to as "MANEMO", described for example in the Internet Draft by Wakikawa et al., "MANEMO Problem Statement" (draft-wakikawa-manemo-problem-statement-00), Feb. 5, 2007.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
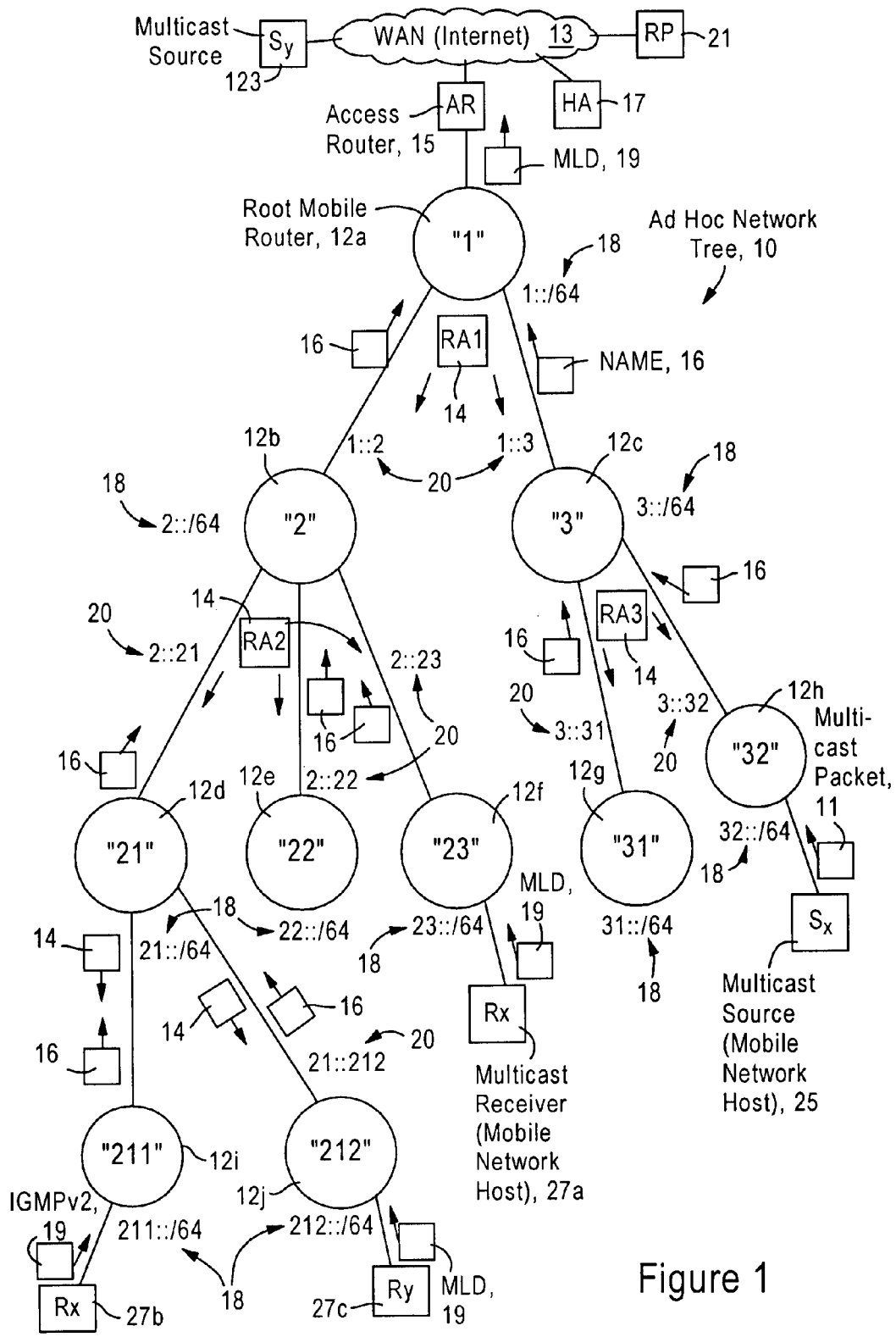
FIG. 1 illustrates an example system including a mobile ad hoc network having mobile routers having established a tree topology for providing multicast services between the mobile ad hoc network and a wide area network, according to an example embodiment.

In one embodiment, a method includes receiving by a mobile router a multicast-supported router advertisement message from an attachment mobile router in a mobile ad hoc network, the multicast-supported router advertisement message specifying an attachment prefix and a multicast-capable identifier. The method also includes attaching by the mobile router to the attachment mobile router in response to the multicast-capable identifier in the multicast-supported router advertisement message and according to a protocol requiring establishment in the mobile ad hoc network of a tree topology having a single multicast clusterhead, the attaching including selecting a default attachment address within an address space of the attachment prefix. The method also includes receiving by the mobile router a multicast request, from an attached node, for access in the mobile ad hoc network for receiving a multicast stream. The method also includes outputting by the mobile router a to the attachment router, the neighbor advertisement message with multicast extension specifying that access to the multicast stream is requested via the default attachment address.

In another embodiment, a method includes outputting by a mobile router a multicast-supported router advertisement message into a mobile ad hoc network. The multicast-supported router advertisement message specifies an attachment prefix owned by the mobile router, an identifier identifying whether a wide area network is reachable via the mobile router, and a multicast-capable identifier that identifies the mobile router as a multicast clusterhead for multicast packets according to a tree topology in the mobile ad hoc network. The method also includes receiving, by the mobile router from an attached mobile router, a first neighbor advertisement message with multicast extension specifying that access to a multicast stream is requested via a first attachment address within an address space of the attachment prefix. The method also includes adding by the mobile router a first binding cache multicast entry to a binding cache in the mobile router specifying the multicast stream is requested via the first attachment address. If the mobile router has access to the wide area network via an access router, the method also includes sending into the wide area network a host-based multicast subscriber request message for access to the multicast stream. If the mobile router receives a multicast packet for the multicast stream from an attached node in the mobile ad hoc network, the method also includes forwarding the multicast packet to the first attachment address specified in the first binding cache multicast entry.

DETAILED DESCRIPTION

Particular embodiments extend use of neighbor discovery messages and router advertisement messages within a mobile ad hoc network (MANET) in order to provide multicast support for multicast streams in the MANET in a manner that eliminates the necessity of coordinated registration between a multicast source and a multicast receiver via a multicast Rendezvous Point (RP). In particular, neighbor discovery messages and router advertisement messages as described in U.S. Patent Publication No. 2005/0265259 enable mobile routers to establish a tree-based topology based on the mobile routers selectively attaching to an attachment mobile router having output a router advertisement message. Each mobile router having attached to an attachment mobile router outputs an update router advertisement message that specifies the relative position of the mobile router relative to the tree-based topology, enabling continued formation of the tree-based topology.

By extending the router advertisement messages generated by the mobile routers to support identification of multicast capabilities, the mobile routers receiving multicast-supported router advertisement messages from other mobile routers can establish the tree topology based on selective attachment to mobile routers based on multicast attributes overlying network topology attributes. Hence, mobile routers can optimize their connections based on selective attachment within the tree topology relative to multicast attributes.

In addition, neighbor discovery messages as described in U.S. Patent Publication No. 2005/0265259 can be used by attachment mobile routers in a MANET to identify network prefixes that are reachable by the source of the neighbor advertisement message (e.g., an attached mobile router): the neighbor advertisement messages can be sent to attachment mobile routers in the MANET, enabling each attachment mobile router in the MANET to send an updated neighbor advertisement message that aggregates the received network prefix information from attached mobile routers. The attached mobile routers and the attachment mobile routers also form a tree topology relative to a clusterhead.

By extending the router advertisement messages generated by the mobile routers to support identification of multicast capabilities, any mobile router receiving a multicast-supported neighbor advertisement message can identify the multicast request specified within the multicast-supported neighbor advertisement message for receiving a multicast stream; moreover, each mobile router that outputs an updated multicast-supported neighbor advertisement messages represents an aggregation of all multicast requests relative to the source address of the updated multicast-supported neighbor advertisement messages. Since all updated multicast-supported neighbor advertisement messages are propagated toward a mobile router serving as a clusterhead in the tree topology, and since the clusterhead has identified itself (via its multicast-supported router advertisement message) as multicast capable, the mobile router serving as a clusterhead actually serves as a "multicast clusterhead" that aggregates all multicast requests within the MANET based on reception of the multicast-supported neighbor advertisement messages.

Since the multicast clusterhead receives all multicast requests within the MANET, the multicast clusterhead is able to forward any received multicast packet (i.e., a multicast data packet having been output by a multicast source) to the multicast listeners based on the received multicast requests. Further, if the multicast clusterhead has access to a wide area network via an access router, the multicast clusterhead can act as a multicast proxy host on behalf of the MANET by sending into the wide area network a host-based multicast subscriber request message, for access to the multicast stream, according to the specific multicast protocol in use (e.g., an IPv4 Internet Group Management Protocol (IGMP) Message or a Multicast Listener Discovery (MLD) message according to RFC 2710). Hence, the particular embodiments eliminate the necessity of existing multicast protocols (e.g., Protocol Independent Multicast-Sparse Mode (PIM-SM) according to RFC 4601) within the MANET. In addition, if the multicast source is located within the MANET, the particular embodiments enable multicast listeners to receive the multicast stream, even if the MANET loses its connection to the wide area network, and despite continual changes in network topology due to movement by mobile routers within the MANET.

Hence, particular embodiments enable multicasting within MANET, without the necessity of existing multicast protocols (e.g., PIM Sparse Mode), which assume a fixed network connectivity. Further, use of multicast-supported neighbor advertisement messages and multicast-supported router advertisement messages within the MANET enables routes to multicast streams within the MANET to be dynamically updated as mobile routers move within the MANET.

FIG. 1 is a diagram illustrating a multicast-capable mobile ad hoc network 10 formed by mobile routers 12: each mobile router 12 can operate as an attachment router (providing a wireless attachment for an attached mobile router) and an attached mobile router (attaching to an attachment mobile router). As illustrated in FIG. 1, the mobile ad hoc network 10 includes a mobile router 12a that has established itself within the mobile ad hoc network 10 as a clusterhead, or root mobile router, of the tree-based topology. As described below, the mobile router 12a advertises itself as a multicast clusterhead (i.e., multicast root) that provides multicast support.

Although it is assumed for simplicity that each mobile router 12 of FIG. 1 is a multicast-capable mobile router that can send and receive multicast-supported router advertisement messages and neighbor advertisement messages with multicast extensions, the mobile ad hoc network 10 also can include mobile routers that lack multicasting capabilities as described herein; hence, any mobile router that is not multicast-capable will output a router advertisement message that does not specify any multicast extension or any multicast-capable identifier, enabling any multicast-capable mobile router 12 to discern between attaching to a multicast-capable mobile router as opposed to a mobile router incapable of supporting multicasting as described herein. Hence, each of the multicast-capable mobile routers 12 will tend to prefer to attach to other multicast-capable mobile routers, when available.

As illustrated in FIG. 1, each mobile router 12 can perform mobile routing operations via a wireless links according to existing MANET protocols, as well as existing mobile IP protocols according to RFC 3775 and RFC 3963. Each mobile router 12 also is assumed to be multicast-capable, namely outputting multicast-supported router advertisement messages 14 and neighbor advertisement messages with multicast extensions (NAMEs) 16, described below. Hence, if the multicast clusterhead 12a is able to access a wide area network 13 via an access router 15, the multicast clusterhead 12a can register with its corresponding home agent 17 according to the existing mobile IP protocols, enabling the multicast clusterhead 12a (and consequently the MANET 10) to be reachable via the home agent 17. Hence, the mobile ad hoc network 10 can operate as a MANEMO while the multicast clusterhead 12a is able to access the wide area network 13. As described below, the multicast clusterhead 12a can operate as a proxy host on behalf of a multicast receiver (e.g., 27b) in the MANET/MANEMO 10 while the wide area network 13 is reachable, and send into the wide area network 13 a host-based multicast subscriber request message 19 to a prescribed rendezvous point 21 or an identified multicast source 123 in the wide area network 13 according to a prescribed multicast protocol such as PIM Sparse Mode, described in RFC 4601.

If, however, the multicast clusterhead 12a loses its communication link with the access router 15, the multicast clusterhead 12a can operate as a default rendezvous point (RP) between a multicast source 25 in the MANET 10 and multicast destinations (i.e., multicast receivers) 27a and 27b having subscribed to the multicast source 25, simply based on receipt of neighbor advertisement messages with multicast extensions 16, without the necessity of a prescribed multicast protocol such as PIM Sparse mode. Once the multicast clusterhead 12a has established reachability with the wide area network 13 (either via the same access router 15 or a new access router), other multicast receivers can receive multicast packets from the multicast source 25 via the tunnel between the mobile router 12a and the home agent 17.

Each mobile router 12 has a corresponding assigned address prefix 18 that is within its own corresponding distinct (i.e., non-overlapping) address space. Hence, each attachment router (e-g., a clusterhead 12a, mobile routers 12b, 12c, 12d, 12f, 12h) is configured for outputting a multicast-supported router advertisement message 14, illustrated in FIG. 3. The multicast-supported router advertisement message includes a tree information option field 66 and a multicast option 67. The multicast-supported router advertisement message 14 includes an attachment prefix field 69 that specifies the prescribed address prefix 18 used by the attachment router (e.g., mobile router 12b), and to be used as an attachment prefix by any mobile device that attaches to the corresponding attachment router. The multicast option 67 is a data structure in the multicast-supported router advertisement message 14 that can include a multicast option identifier 71 and a multicast group identifier field 73. The multicast option identifier 71 identifies the option 67 as providing multicast information, and the multicast group identifier field 73 can provide an identifier for a specific multicast group, described in more detail in RFC 3513. Alternately, the multicast option 67 can be substituted with a single-bit flag that indicates that the mobile router 12a generating the multicast-supported router advertisement message 14 can operate as a multicast clusterhead.

Figure 3:
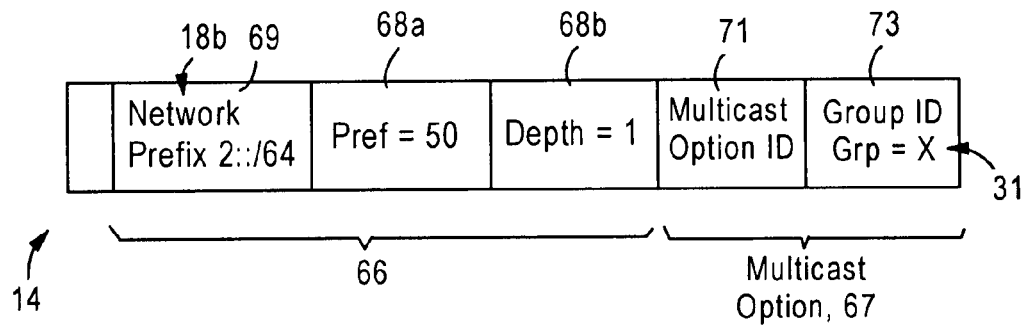
FIG. 3 illustrates an example multicast-supported router advertisement message having a tree information option portion and a multicast extension portion according to an example embodiment.

Hence, the multicast-supported router advertisement message 14 includes a "multicast-capable identifier" that can be implemented to include at least a single-bit flag indicating the mobile router 12a generating the multicast-supported router advertisement message 14 can operate as a multicast clusterhead (according to a prescribed message format recognized by the other mobile routers 12 and/or network hosts 27 receiving the multicast-supported router advertisement message). Alternately, the "multicast-capable identifier" can be implemented to include the multicast option 67 as illustrated in FIG. 3.

Hence, each attached mobile router (e.g., 12b, 12c, 12d, 12e, 12f, 12g, 12h, 12i, 12j) is configured for attaching to one of the attachment routers in response to received multicast-supported advertisement messages 14 by selecting a default attachment address 20 within the address space of the address prefix 18 specified in the attachment prefix field 69, and in compliance with a protocol requiring establishment of a tree topology having a single clusterhead. Note that the address prefix (e.g., "1::/64") 18 used by a mobile router (e.g., 12a) refers to the address prefix used by the mobile router 18 in creating and maintaining an addressable subnet for routing of data packets to nodes having attached to the mobile router 18; in other words, a mobile router 18 includes address table entries for routing packets within the subnet specified by the address prefix used by the mobile router 18.

The tree topology illustrated in the mobile ad hoc network 10 is relied upon in minimizing the amount of routing information needed to be transferred among mobile routers. In particular, a tree topology having a single clusterhead 12a inherently has no loops. Since the tree topology 10 inherently has no loops, attached mobile routers 12 can reduce routing protocol requirements by aggregating relevant routing information necessary for an attachment mobile router to identify network address prefixes that are reachable via an attached mobile node.

Figure 2:
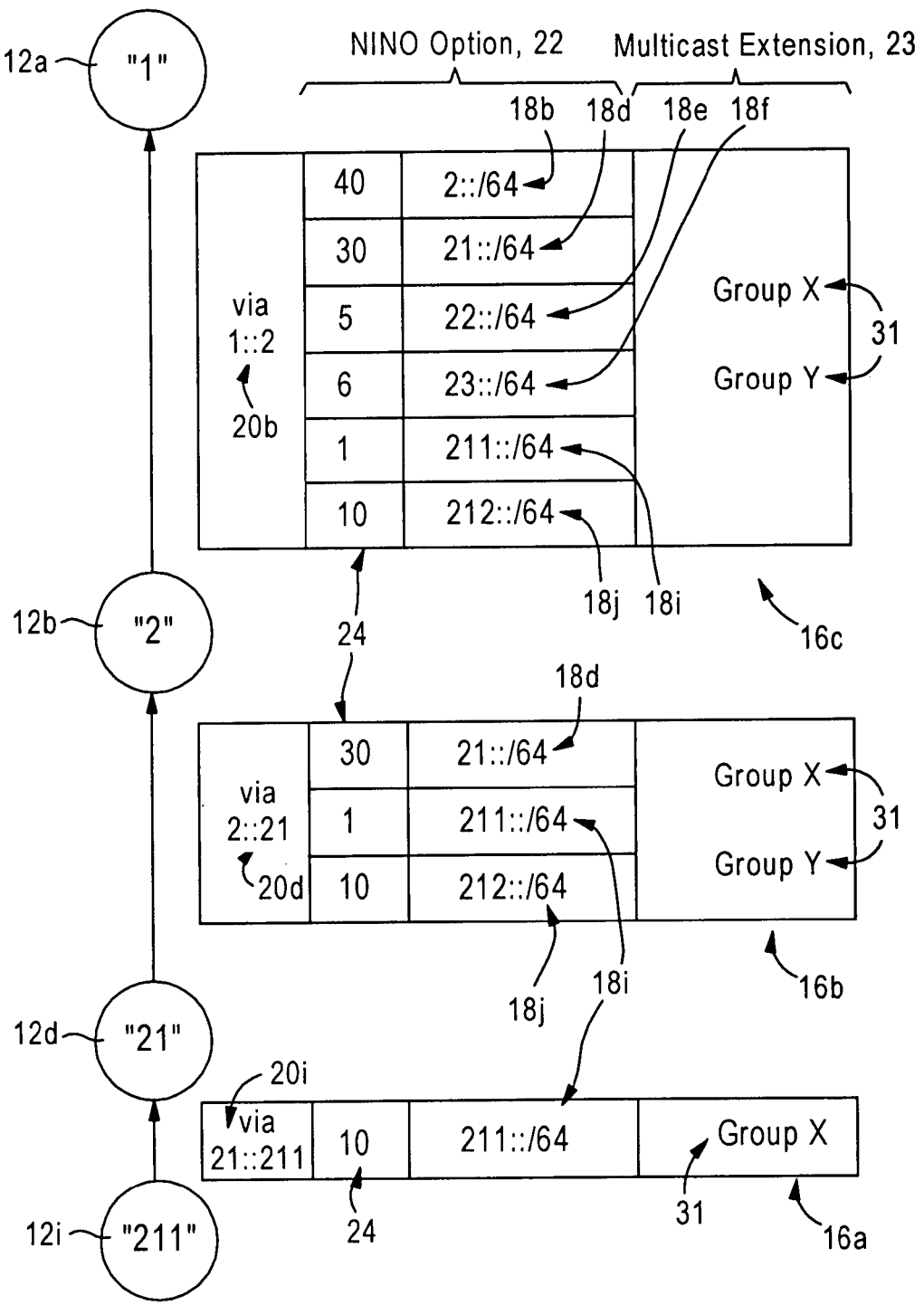
FIG. 2 illustrates an example neighbor advertisement message with multicast extension according to an example embodiment.

Hence, the attached mobile routers (e.g., 12b, 12c) identify themselves to an attachment mobile router (e.g., 12a) by sending neighbor advertisement messages with multicast extensions 16, illustrated in FIG. 2, that specify a default attachment address 20 used by the source of the neighbor advertisement message, a network-in-node (NINO) option 22, and /or a multicast extension 23. As will be apparent, each attached mobile router (e.g., 12b, 12d, 12i) can output a neighbor advertisement message with multicast extension (NAME) 16 that includes the default attachment address 20 and the multicast extension 23 (also referred to as a Neighbor Advertisement Option for Multicast Information (NAOMI)), but which does not include the NINO option 22.

The network-in-node option 22 specifies to the attachment mobile router (e.g., 12a) merely that a given network prefix 18 (e.g., 2::/64 of mobile router "2" 12b) is reachable via the default attachment address 20 (e.g., 1::2) within the address space of the address prefix 18 of the attachment router (i.e., the attachment prefix).

The multicast extension 23 identifies to an attachment router, at a minimum, that access to a multicast stream is requested via the default attachment address 20, where the multicast identifier (e.g., group identifier) can be unspecified if unknown by the multicast receiver 27b. In particular, a mobile router (e.g., 12i) receives a host-based multicast subscriber request message 19, for example an IGMP message from an IPv4 host node 27b, or a Multicast Listener Discovery (MLD) message from an IPv6 host node 27a or 27c according to RFC 2710. In response to receiving the host-based multicast subscriber request message 19, the mobile router (e.g., 12i) caches the host-based multicast subscriber request message 19 in an internal binding cache multicast entry specifying that the multicast receiver 27b requests access in the MANET 10 for receiving a multicast stream, or can at least cache the source address of the requesting host 27 (for example in accordance with RFC 3376). If the multicast stream is identified by a multicast group identifier (e.g., a valid IPv4 IPv6 group address "X") 31 in the host-based multicast subscriber request message 19, the identifier 31 is added to the multicast extension 23; at a minimum, the multicast extension 23 can be implemented as a flag indicating that multicast listening is requested.

As described below, the information in the neighbor advertisement message with multicast extension 16 is cached by each mobile router receiving the message 16, and the aggregated information in the binding cache entries is added to a new neighbor advertisement message 16.

Hence, each attachment mobile router can determine from the network in node option 22 the network prefixes 18 that are reachable via the default attachment address 20, and the multicast streams 31 that are requested in the multicast extension 23 via the default attachment address 20. Note that no further routing or multicast information needs to be sent to the attachment router 12, since the attachment mobile router only needs to be aware of address prefixes of attached mobile routers and any requested multicast groups. Since each mobile router 12 is configured for routing any packet specifying an unknown destination to its default attachment router, any packet, including a multicast packet 33 from a multicast source 25, is routed toward the multicast clusterhead 12a, enabling the multicast clusterhead 12a to forward the multicast packet 33 to any attached mobile router having requested the multicast stream.

Hence, the disclosed embodiment provides an efficient proactive multicast-supported routing protocol for mobile ad hoc networks that minimizes the necessity of bandwidth and processing requirements to accommodate rapid topology changes by providing rapid convergence.

As described above, the disclosed embodiment relies on the formation by the mobile routers 12 of the tree topology, illustrated in FIG. 1. A description will first be provided of formation of the tree topology, followed by a description of the neighbor discovery messages 16 used to forward reachability information.

The disclosed embodiment dynamically assembles the layer 2 clusters into a tree-based topology model 10 as illustrated in FIG. 1 using the attachment techniques described in commonly-assigned, copending application Ser. No. 10/218,515, filed Aug. 15, 2002, entitled "ARRANGEMENT FOR ROUTER ATTACHMENTS BETWEEN ROAMING MOBILE ROUTERS IN A MOBILE NETWORK", published on Feb. 19, 2004 as U.S. Patent Application Publication US 2004/0032852 A1. In summary, a mobile router is configured for attaching to a selected router in a mobile network based on identifying a network topology model of the mobile network from received router advertisement messages that include tree information option fields specifying attributes of the network topology model. The mobile router selects which router advertisement originator to attach to based on correlating the attributes of the router advertisement originators relative to identified priorities, and orders the router advertisement originators within a default router list based on the identified priorities. The mobile router attaches to one of the routers in the ordered default router list having a higher priority, and upon attaching to the router advertisement originator as its attachment router, the mobile router transmits its own corresponding router advertisement message including a corresponding tree option field that specifies the attributes of the mobile router within the network topology model, enabling other routers to selectively connect and/or reconnect within the mobile network based on their respective identified preferences.

According to the disclosed embodiment, the MANET 10 is organized into a tree-based topology cluster, where the multicast clusterhead (i.e., a root of a tree) 12a is determined by having the highest relative preference metric visible to other mobile routers. Preference metric may be based on an explicit preference value, described below, or based on a tree depth identifier indicating the relative position of the mobile router relative to the clusterhead; in other words, tree depth indicates the number of hops to the clusterhead. A mobile router associates with the multicast-supported (RA) originator by storing the information in the RA message in its default router list, and selecting the source of the RA message as its attachment router.

Hence, the mobile routers 12b through 12j choose attachment routers based on preference metrics specified in received multicast-supported router advertisement messages 14. As illustrated in FIG. 1, the mobile routers 12b and 12c, in response to detecting the unsolicited multicast-supported router advertisement message ("RA1") 14, add the RA1 message 14 to their internal default router lists 55, illustrated in FIG. 4. The mobile routers 12b and 12c select the mobile router 12a as their attachment router based on a specified preference metric (e.g., preference value, mobile router 12a advertised as a multicast clusterhead having multicasting ability, identified multicast group, etc.).

Figure 5:
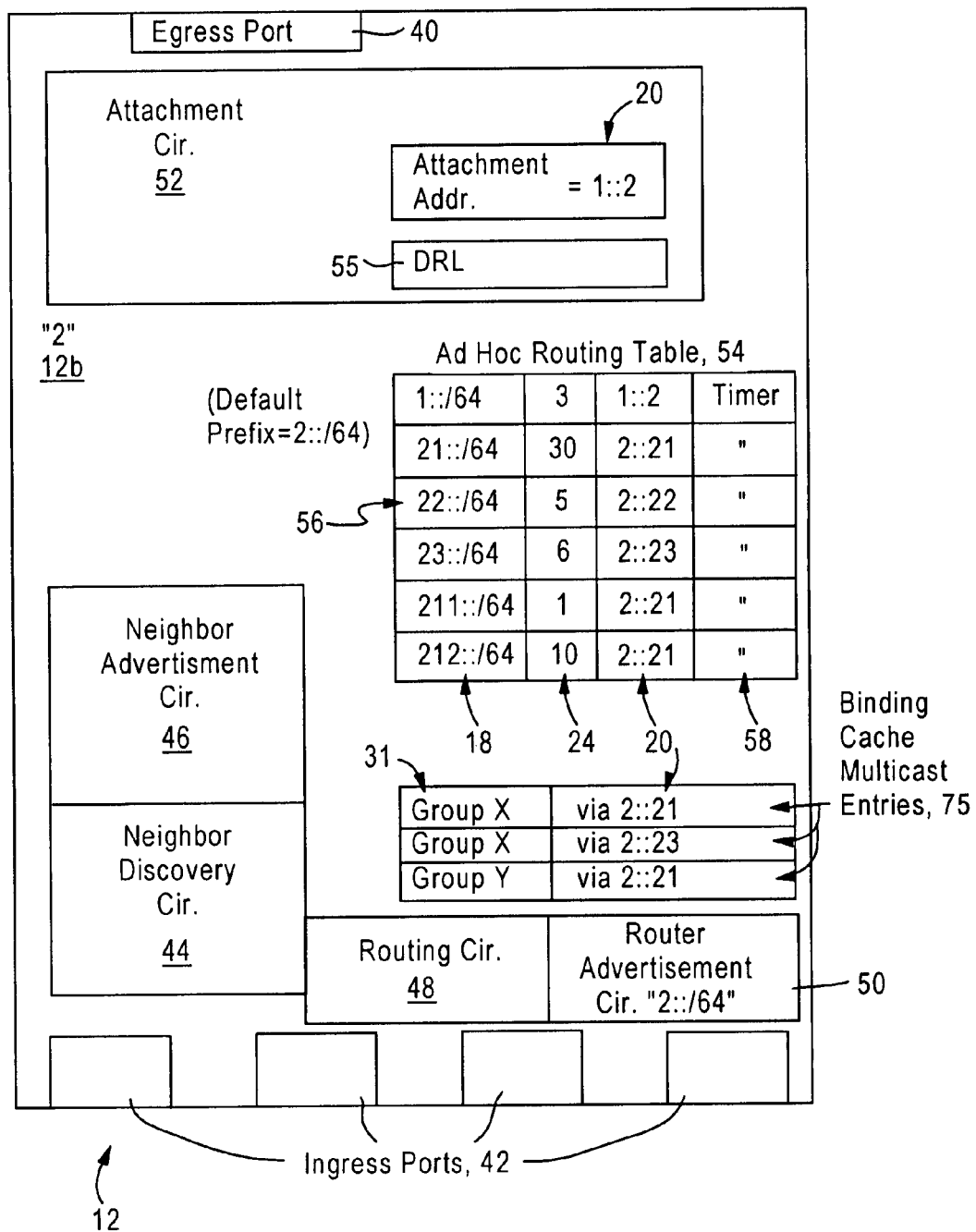
FIG. 5 illustrates an mobile router from the system of FIG. 1 according to an example embodiment.

For example, the mobile router 12b creates a default attachment address ("1::2") 20 on its egress interface (i.e., toward the clusterhead) that is within the address space of the address prefix "1::/64" 18 advertised by the multicast clusterhead 12a; the mobile router 12b also adds an entry in its routing table 54 of FIG. 5 that specifies that the address prefix "1::/64" is reachable via the default attachment address "1::2" 20. Similarly, the mobile router 12c creates its own default attachment address ("1::3") 20 that is within the address space of the address prefix "1::/64" 18 advertised by the clusterhead 12a; the mobile router 12c also adds an entry in its routing table that specifies that the address prefix "1::/64" is reachable via the default attachment interface having been assigned the default attachment address "1::3".

The mobile routers 12b and 12c begin outputting respective multicast-supported messages "RA2" and "RA3" 14, advertising their respective address prefixes 18 ("2::/64" and "3::/64"), and the tree depth/preference for the specified multicast group 31 based on the multicast clusterhead 12a being the top level mobile router. As described above, any unknown address is sent by a mobile router to its default attachment address; hence, the multicast-supported messages "RA2" and "RA3" 14 need not specify the address prefix "1::/64" of the clusterhead, since all attached mobile routers (e.g., 12d, 12e, 12f, 12g, 12g) will forward unknown destinations by default to the mobile routers 12b or 12c.

The mobile routers 12d, 12e, 12f having the respective network prefixes 18 ("21::/64", "22::/64", and "23::/64") attach to the mobile router 12b as their attachment router by selecting respective default attachment addresses 20 ("2::21", "2::22" and "2::23"). The mobile routers 12g, 12h, having the respective network prefixes 18 ("31::/64" and "32::/64") attach to the mobile router 12c as their attachment router by selecting respective default attachment addresses 20 ("3::31" and "3::32").

Similarly, the mobile router 12d outputs a multicast-supported message "RA21" 14 advertising its address prefix 18 ("21::/64"), and the multicast-capable identifier (implemented as a single-bit flag indicating the originating source of the message 14 can serve as a multicast clusterhead, or implemented as the multicast option 67). In response, the routers 12i and 12j having address prefixes 18 ("211::/64" and "212::/64") select respective default attachment addresses 20 ("21::211" and "21::212").

Assuming that no other information has been output into the network 10 other than the multicast-supported router advertisement messages 14, each mobile router only knows its default route toward the multicast clusterhead 12a for multicast traffic. In other words, none of the mobile routers 12 have any information related to any attachment nodes away from the clusterhead. For example, if the mobile router 12i ("211") wanted to send a ping to the mobile router 12h at the destination address "32::1", the ping would be transferred up to the clusterhead 12a by the mobile routers 12d and 12b, which are configured to output unknown destinations on their respective default attachment addresses. However, since the mobile router 12a does not know about the reachability of the mobile router "32" 12h serving the address prefix "32::/64", the mobile router 12a would drop the ping unless was specifically addressed to a destination address within the address prefix "1::/64" used by the clusterhead 12a. Also note that even though the mobile router 12a may know about the layer 2 (MAC) addresses of the mobile routers 12b and 12c, the mobile router 12a does not have information regarding the global IP addresses utilized by the mobile routers 12b and 12c; further, the mobile router 12a would not be able to locate the address prefixes used by the mobile routers 12d, 12e, 12f, 12g, 12h, 12i, and 12j because they do not share a layer 2 link with the mobile router 12a.

At this stage proactive routing protocols typically would be used to exchange topology and reachability information between the routers, and to ensure no loops were formed. However, the disclosed embodiment emphasizes minimizing the use of routing protocols due to their substantial costs that increase convergence times.

However, internal communications within the MANET 10 can be minimized using the neighbor discovery messages 16, eliminating the necessity for optimizing procedures such as the proactive Optimized Routing Algorithm (ORA) protocol, which suffers from slow convergence times due in part to the required storage of state information. In contrast to all the mobile routers 12 registering with the multicast clusterhead 12a to provide the clusterhead 12a with the source route path to all the prefixes 18, the multicast clusterhead 12a simply needs to know which attachment address (e.g., 1:2 or 1:3) 20 should be used to reach the identified prefix 18. Hence, each attached mobile router 12 sends to its attachment router a neighbor advertisement message 16 specifying that the prescribed address prefix used by the mobile router 12, and any address prefixes stored internally from received neighbor advertisement messages received by the attached mobile router from other mobile routers, are reachable via the default attachment address used by the mobile router 12.

Further, use of the multicast extension 23 as illustrated in FIG. 2 enables a neighbor advertisement message with multicast extension 16 to be sent that specifies no more than the default attachment address 20 and the multicast extension 23, indicating to the multicast clusterhead that any received multicast traffic should be forwarded to the default attachment address specified in the neighbor advertisement message with multicast extension 16. As described below, the neighbor advertisement message with multicast extension 16 also can specify a specific multicast group 31, and sequence identifiers 24, enabling the multicast clusterhead 12a to provide rapid convergence in response to topology changes due to movement of the attached mobile routers 12 in the MANET 10.

FIG. 2 is a diagram illustrating successive neighbor advertisement messages with multicast extensions 16a, 16b, and 16c output by the respective mobile routers 12i, 12d, and 12b based on having attached to an attachment router according to the tree topology 10 of FIG. 1. As illustrated in FIG. 2, the mobile router 12i outputs the neighbor advertisement message with multicast extension 16a with a network-in-node option portion 22 specifying the address prefix ("211::/64") 18i used by the mobile router 12i, and the default attachment address 20i selected by the mobile router 12i. As described above, the default attachment address 20i is within the address space of the attachment prefix ("21::/64) 18d used by the mobile router 12d serving as an attachment router for the mobile router 12i. The neighbor advertisement message with multicast extension 16a also includes a sequence identifier 24 for the corresponding address prefix 18i, described below.

The neighbor advertisement message with multicast extension 16a also includes a multicast extension 23, having been added by the mobile router 12i in response to receiving the host-based multicast subscriber request message 19 from the host node 27b. Hence, the mobile router 12i does not forward the host-based multicast subscriber request message 19, but rather caches the host-based multicast subscriber request message 19 in an internal binding cache multicast entry and adds the multicast extension 23 to specify that access to a multicast stream (e.g., identified by the identifier 31) is requested via the default attachment address 20i.

The mobile router 12d, in response to receiving the neighbor advertisement message with multicast extension 16a, creates an entry in its internal ad hoc routing table that specifies that the address prefix ("211::/64") 18i is reachable via the attachment address ("21::211") 20i. The mobile router 12d also adds an internal binding cache multicast entry 75 to specify that multicasting is requested via the attachment address 20i. As illustrated in FIG. 1, the mobile router 12d also receives a neighbor advertisement message with multicast extension 16 from the mobile router 12j specifying that access to a multicast stream (Group "Y") is requested via the default attachment address "21::212" 20: the mobile router 12j generates this message 16 in response to the MLD-format host-based multicast subscriber request message 19 from the IPv6 host node 27c.

Since a mobile router 12 may receive the multicasting request either in the form of a host-specific multicast subscriber request message 19 or in the form of a multicast extension 23 in a neighbor advertisement message with multicast extension 16, the term "multicast request" as used herein refers to any multicast request for receiving a multicast stream, either in the form of a host-specific multicast subscriber request message 19 or in the form of a multicast extension 23 in a neighbor advertisement message with multicast extension 16, and which may or may not include a specific multicast group identifier.

As apparent from the foregoing, since the attachment address 20i is within the address space of the attachment prefix 18d used by the mobile router 12d, the mobile router 12d will know how to route any data packet to the attachment address 20i based on correlating the attachment address 20i to a prescribed ingress interface having a prescribed layer 2 (MAC) address. Although not shown, it is assumed the mobile router 12d also creates a routing table entry for the mobile router 12j in response to receiving a corresponding neighbor advertisement message 16 from the mobile router 12j specifying that its corresponding network prefix ("212::/64") 18j is reachable via its corresponding default attachment address ("21::212").

In response to creating the new entry either in its internal ad hoc routing table 54, or a new binding cache multicast entry 75, the mobile router 12d outputs the neighbor advertisement message with multicast extension 16b that specifies that the network address prefix 18d used by the mobile router 12d, as well as the network address prefixes 18i and 18j stored in its ad hoc routing table, are reachable via the default attachment address ("2::21") 20d of the mobile router 12d. The corresponding multicast extension 23 specifies that multicast groups "X" and "Y" are requested for the corresponding default attachment address 20d, based on the requests initiated by the host receivers 27b and 27c within the subtree of the mobile router 12b.

The mobile router 12b repeats the process of adding entries to its internal ad hoc routing table 56 and its binding cache multicast entries 75 in response to receiving the neighbor advertisement message with multicast extension 16b, and the neighbor advertisement messages with multicast extensions from the mobile router 12e and 12f specifying that the address prefixes "22::/64" 18e and "23::/64" 18f are reachable via the default attachment addresses "2::22" and "2::23", respectively, and that multicast group "X" is requested via attachment addresses "2::21" and "2::23", and that multicast group "Y" is requested via attachment address "2::21". In response to adding the entries in the routing table 54 and the binding cache multicast entries 75, the mobile router 12b outputs the neighbor advertisement message with multicast extension 16c specifying that its prescribed subnet prefix ("2::/64") 18b, plus the address prefixes 18d, 18e, 18f, 18i, and 18j stored in its internal ad hoc routing table are reachable via the default attachment address ("1::2") 20b of the mobile router 12b. Also note that each network prefix 18 specified in the neighbor advertisement message with multicast extension 16a, 16b has its corresponding sequence identifier 24 propagated up to the next neighbor advertisement message 16c. In addition, the multicast extension 23 of the neighbor advertisement message with multicast extension 16c specifies that multicast groups "X" and "Y" 31 are requested via the default attachment address ("1::2") 20b. As described previously, the NINO option 22 can be omitted from the neighbor advertisement message with multicast extension 16c if the routing topology information is not needed, for example in response to a new multicast request being sent shortly after a prior neighbor advertisement message that included the NINO option and well before any timer expiration for a routing table entry.

Hence, in response to receiving the neighbor advertisement message with multicast extension 16c from the attached mobile router 12b, and a corresponding neighbor advertisement message 16 from the mobile router 12c, the mobile router 12a has sufficient address information to reach all of the subnet prefixes 18 in the network 10, and needs to choose simply whether to route a packet to the attachment address "1::2" or "1::3" within its prescribed subnet prefix "1::/64". Further, the mobile router 12a can identify which attachment address "1::2" and/or "1::3" should be forwarded a multicast packet having been originated, for example, from a source 25 within the MANET 10, or a source 123 via the wide area network 13 during intervals that the mobile router 12a can access the wide area network 13.

FIG. 5 is a diagram illustrating one of the mobile routers 12, according to an example embodiment. For illustration sake, the mobile router 12b ("2") is illustrated in FIG. 5 to illustrate the values stored in the routing table 54 and the binding cache multicast entries 75. The mobile router 12 can include one or more network interface circuits, each network interface circuit including at least one egress port 40 and ingress ports 42. The egress port 40 is configured for establishing a wireless attachment link with an attachment router (e.g., the clusterhead 12a), and the ingress ports 42 can be configured for outputting multicast-supported router advertisement messages and receiving neighbor discovery messages 16. Each of the ingress and egress ports can be implemented, for example, as logical interfaces, wherein the interface circuit that includes the egress port 40 and the ingress ports 42 can output the messages via wireless IEEE 802.11g links.

The mobile router 12 also can include multicast-supported circuitry, also referred to generally as a multicast-supported circuit. The multicast-supported circuit includes a neighbor discovery circuit 44, a neighbor advertisement circuit 46, a routing circuit 48, a multicast-supported router advertisement circuit 50, an attachment circuit 52, an ad hoc routing table 54 and binding cache multicast entries 75 (note that the ad hoc routing table and the entries 75 can be implemented as data structures within the multicast-supported circuit or within a tangible memory distinct from the multicast-supported circuit). The attachment circuit 52 includes a default router list 55, stored in tangible memory (e.g., non-volatile read access memory (RAM)) illustrated in FIG. 4.

Any of the disclosed circuits of the mobile router 12 (including the multicast-supported circuit and its component circuits 44, 46, 48, 50, and 52) can be implemented in multiple forms, including hardware logic that is implemented in a logic array such as a programmable logic array (PLA), a field programmable gate array (FPGA), or by mask programming of integrated circuits such as an application-specific integrated circuit (ASIC); any of these circuits also can be implemented using a software-based executable resource that is executed by a corresponding internal processor such as a microprocessor (not shown), where execution of executable code stored in internal nonvolatile memory (not shown) causes the processor to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor.

Further, any reference to "outputting a message" or "outputting a packet" can be implemented based on creating the message/packet in the form of a data structure and storing that data structure in a tangible memory medium in the disclosed apparatus (e.g., in a transmit buffer), and electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

The neighbor advertisement circuit 46, the neighbor discovery circuit 44, and the multicast-supported router advertisement circuit 50 can be implemented for example in accordance with the Request for Comments (RFC) 2461, Neighbor Discovery for IP version 6 (IPv6), published by the IETF.

The router advertisement circuit 50 is configured for outputting multicast-supported router advertisement messages 14 including the tree information option field 66, and the multicast-capable identifier (e.g., the single-bit flag indicating multicast capability or the multicast option 67), illustrated in FIG. 3. In particular, the advertisement message 14 output by the mobile router 12b specifies within the tree information option field 66 the network prefix 18b, a preference value 68a, and/or a tree depth 68b. The preference field 68a is configured for storing a preference value for the mobile router 12 as stored in a corresponding preference register (not shown), enabling a mobile router receiving the RA message 14 to decide whether to associate with the source of the RA message 14. The tree depth field 68b is configured for storing the depth of the mobile router 12 within the tree (i.e., the number of hops to the clusterhead), enabling other routers receiving the RA message 34 to determine the relative position of the router advertisement originator within the tree 10. As described previously, the multicast option identifier 71 identifies the option as providing multicast information, and the multicast group identifier specifies an available multicast group supported by the mobile router.

The neighbor discovery circuit 44 is configured for adding the respective routing table entries 56 to the ad hoc routing table 54 and the binding cache multicast entries 75, each stored as a data structure in a tangible memory (e.g., a dynamic RAM (DRAM) or a non-volatile RAM) of the mobile router 12, based on receiving the respective neighbor advertisement messages 16. The neighbor discovery circuit 44 also is configured for determining whether to overwrite an existing entry 56 or 75 based on receiving another neighbor advertisement message 16 that supersedes a stored entry, for example that specifies a sequence number 24 for the corresponding address prefix 18 that is higher than the stored sequence number 24. The neighbor discovery circuit 44 also is configured for selectively deleting a table entry 56 or a binding cache multicast entry 75, for example based on determining that an inactivity timer entry value (e.g., field 58) indicates, when compared with an internal system clock, that a prescribed inactivity interval has elapsed, requiring the inactive entry 56 or 75 be removed.

The attachment circuit 52 includes a default router list 55, enabling the attachment circuit 52 to select an attachment router from the corresponding multicast-supported router advertisement message 14 according to selection criteria as specified by the corresponding preference value 68a, tree depth value 68b, or multicast group membership and relative depth, to ensure that the attachment router is selected in a manner to ensure the tree topology is maintained in the ad hoc network. Hence, the attachment circuit 52 is responsible for implementing the protocol requiring establishment of the tree topology in the ad hoc network. Additional details regarding selection of an attachment router to ensure a tree-based topology is described in the published application US 2004/0032852 A1, published Feb. 19, 2004.

Figure 4:
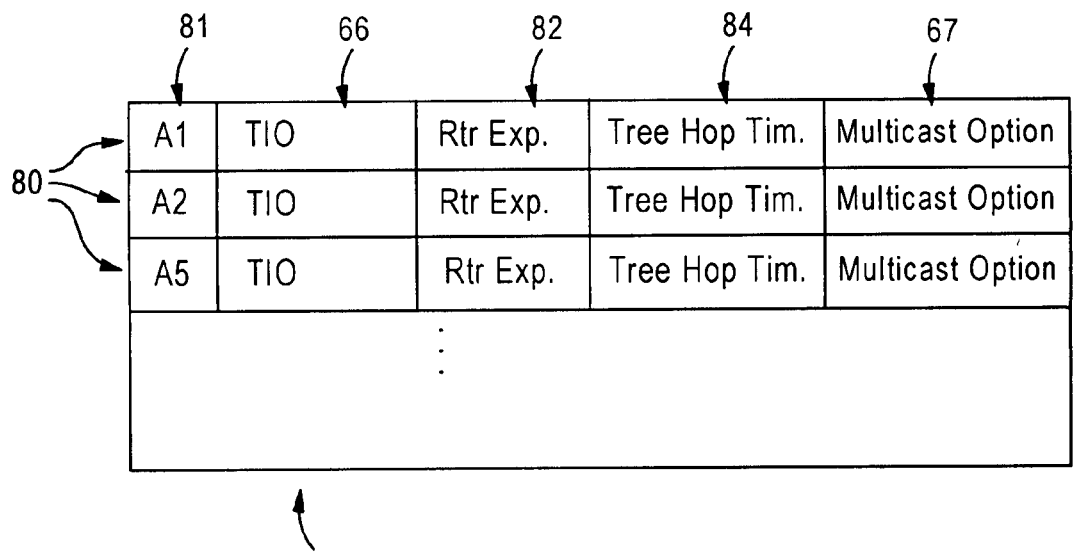
FIG. 4 illustrates an example default router list according to an example embodiment.

In summary, the default router list 55, illustrated in FIG. 4, is configured for storing the known trees 38 in an ordered list, per order of preference, by extending IPv6 default router lists to include tree information and multicast-capable identifier (e.g., flag or multicast options 67), if present. In particular, each entry 80 of the default router list 55 includes a router address field 81, the tree information option fields 66 as received from the multicast-supported router advertisement message 14, a router expiration timer field 82 that specifies information, including timer ID, to determine the expiration of the entry, a tree hop timer field 84 that specifies information, including a corresponding timer ID, to delay any response to a received RA message in order to provide tree stability, and the multicast option field (or single-bit flag) to identify whether the advertising router is multicast-capable.

A timer circuit in the attachment circuit 52 is configured for calculating timer values from the timer information stored in the fields 82, 84, to determine if the corresponding timer has expired, requiring priority determination or selection operations.

Hence, the attachment circuit 52 in each router 12 independently determines whether to associate with another multicast-supported router advertisement originator having output an RA message based on the tree information segment 66 and multicast-capable identifier (e.g., flag or multicast option 67) within the RA message 14: the tree information segment 66 specifies attributes 68 about the tree to which the router advertisement originator is associated, including tree identifier (address prefix) tree depth, and tree preference. The multicast-capable identifier specifies whether the root of the tree (and the routers along the path to the root) are multicast-enabled), and whether they subscribe to a prescribed multicast group. Once stored as entries in the default router list 55, the priority determination circuit 42 can maintain the known trees in an ordered list, per order of preference: each entry 80 is maintained until the corresponding router expiration timer field 82 expires.

It should be noted that multiple trees typically should be present in the ad hoc network 10 only during initial formation of the tree-based topology: in other words, smaller trees will eventually converge into a single larger tree, resulting in more stability and connectivity throughout the entire ad hoc network. Nevertheless, the use of neighbor advertisement messages can still used in individual trees during network formation, since the relatively low overhead enables information to be quickly updated with rapid convergence.

The attachment circuit 52 in the mobile router (e.g., 12b) identifies the selected attachment router (e.g., 12a) by choosing a default attachment address (e.g., "1::2") 20 within the address space of the advertised prefix (i.e., the attachment prefix) (e.g., "1::/64"), and adding a table entry 56 that specifies that the attachment prefix (e.g., "1::/64") is reachable via the default attachment address ("1::2") 20.

The mobile router 12 of FIG. 5 (e.g., 12b) also includes a neighbor advertisement circuit 46. As described above with respect to FIG. 2, the neighbor advertisement circuit 46 is configured for outputting the corresponding neighbor advertisement message with multicast extension 16 (e.g., 16c) specifying the corresponding address prefix (e.g., "2::/64" 18b) used by the mobile router, as well as the address prefixes (e.g., 18d, 18e, 18f, 18i, 18j) stored in the ad hoc routing table 54 by the neighbor discovery circuit 44 in response to received neighbor advertisement messages 16 from attached mobile routers, and the requests for the multicast groups 31 (e.g., "X" and "Y") are reachable via the default attachment address 20 (e.g. "1::2" 20b).

The routing circuit 48 is configured for routing a received data packet having a specified destination address. If the specified destination address is within the address realms of one of the address prefixes stored in the ad hoc routing table 54, the routing circuit 48 outputs the data packet to the specified attachment address 20. However, if the specified destination is unknown (i.e., no common prefix specified within the ad hoc routing table 56), or if the received data packet is a multicast data packet 11 having been generated by a multicast source 25 the data packet is output using the default attachment address 20 to the attachment router via the egress port 40, based on the assumption that the attachment router will have more routing information. If the mobile router 12 does not have an attachment router and the specified destination is unknown, the packet is dropped. Any received multicast packet 11 that matches a binding cache multicast entry 75 is output to the corresponding default attachment address 20 specified in the entry 75.

Figure 6:
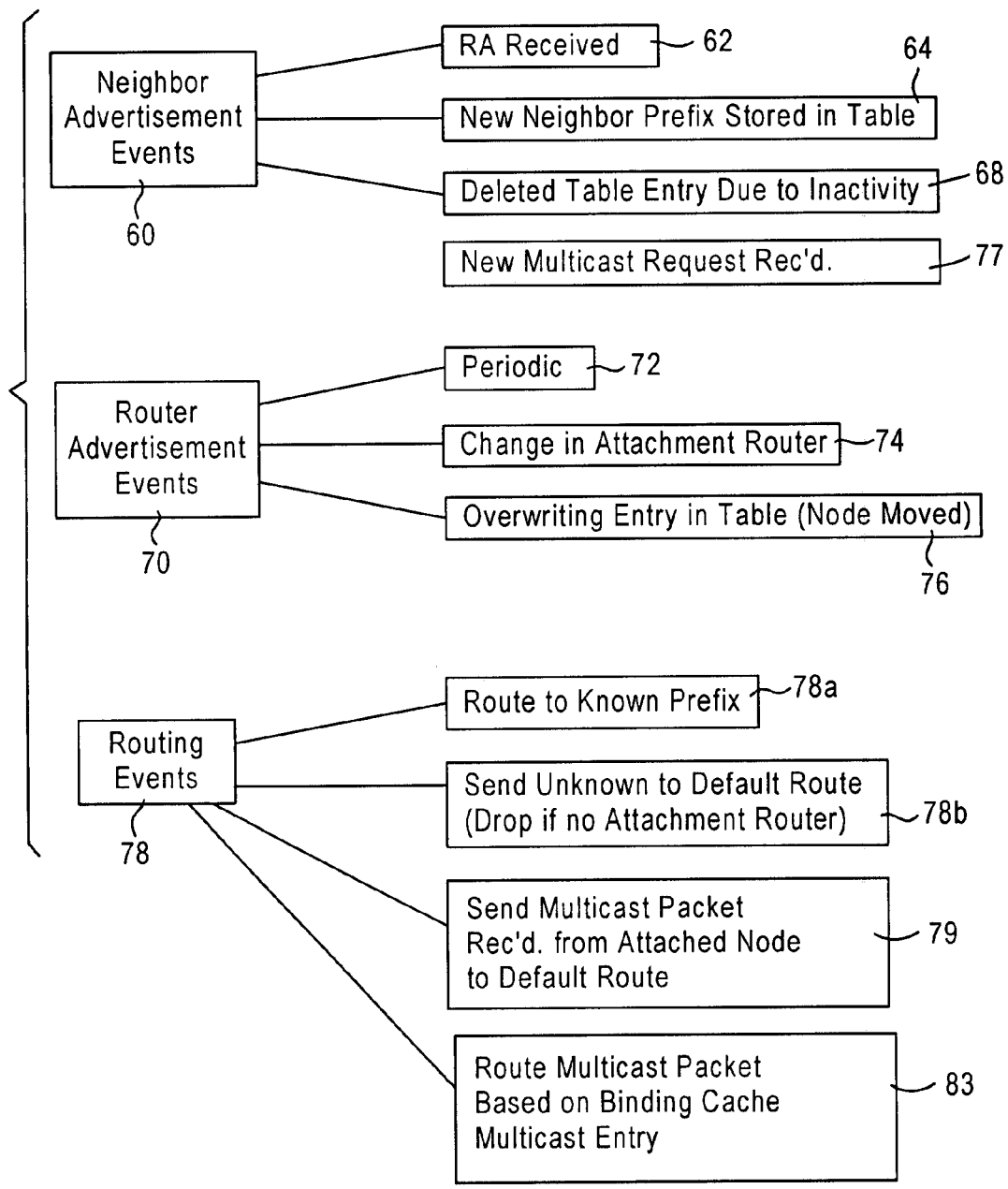
FIG. 6 is a diagram illustrating example neighbor advertisement message output events, router advertisement message output events, and routing events.

FIG. 6 is a diagram summarizing different events that may cause different operations within the mobile router 12. For example, the neighbor advertisement circuit 46 is configured for executing neighbor advertisement events 60 (i.e., outputting the neighbor advertisement message with multicast extension 16) in response to reception of a conventional router advertisement message or multicast-supported router advertisement message (event 62), in response to the neighbor discovery circuit 44 storing a new address prefix entry 56 in the table 54 (event 64), in response to deletion of an entry 56 or 75 by the neighbor discovery circuit 44 due to inactivity, as measured by the corresponding timer entry 58 (event 68), or reception of a multicast request (e.g., a host-based multicast subscriber request message 19 or a neighbor advertisement message with multicast extension specifying a multicast extension 23) from an attached node for access for receiving a multicast stream (event 77). The execution of the event 60 in response to the event 62 enables an attachment router to force attached mobile routers to resubmit their neighbor advertisement messages with multicast extensions 16, for example if the attachment router detects a topology change, described below.

The multicast-supported router advertisement circuit 50 is configured for outputting multicast-supported router advertisement messages (event 70) either at prescribed periodic intervals (event 72), in response to a change in the attachment router (event 74), or in response to overwriting an entry 56 or 75 due to a detected node movement (event 76). Note that event 76 in the attachment router causes the execution of event 60 in the attached router in response to event 62.

The routing circuit 48 performs any one of four routing events 78: routing a known destination address to a prescribed destination specified in the ad hoc routing table 54 (event 78a), routing an unknown destination address to the default attachment address 20 for the mobile router (event 78b) (if the mobile router is not attached to an attachment router (e.g., the mobile router is the clusterhead 12a), the packet is dropped). The routing circuit also can route a multicast packet 11 received from an attached node to its attachment router as the default path (event 79), and selectively route the multicast packet 11 (received from either an attached node or the corresponding attachment router) to a destination specified in the binding cache multicast entry 75 (event 83).

Figure 7A:
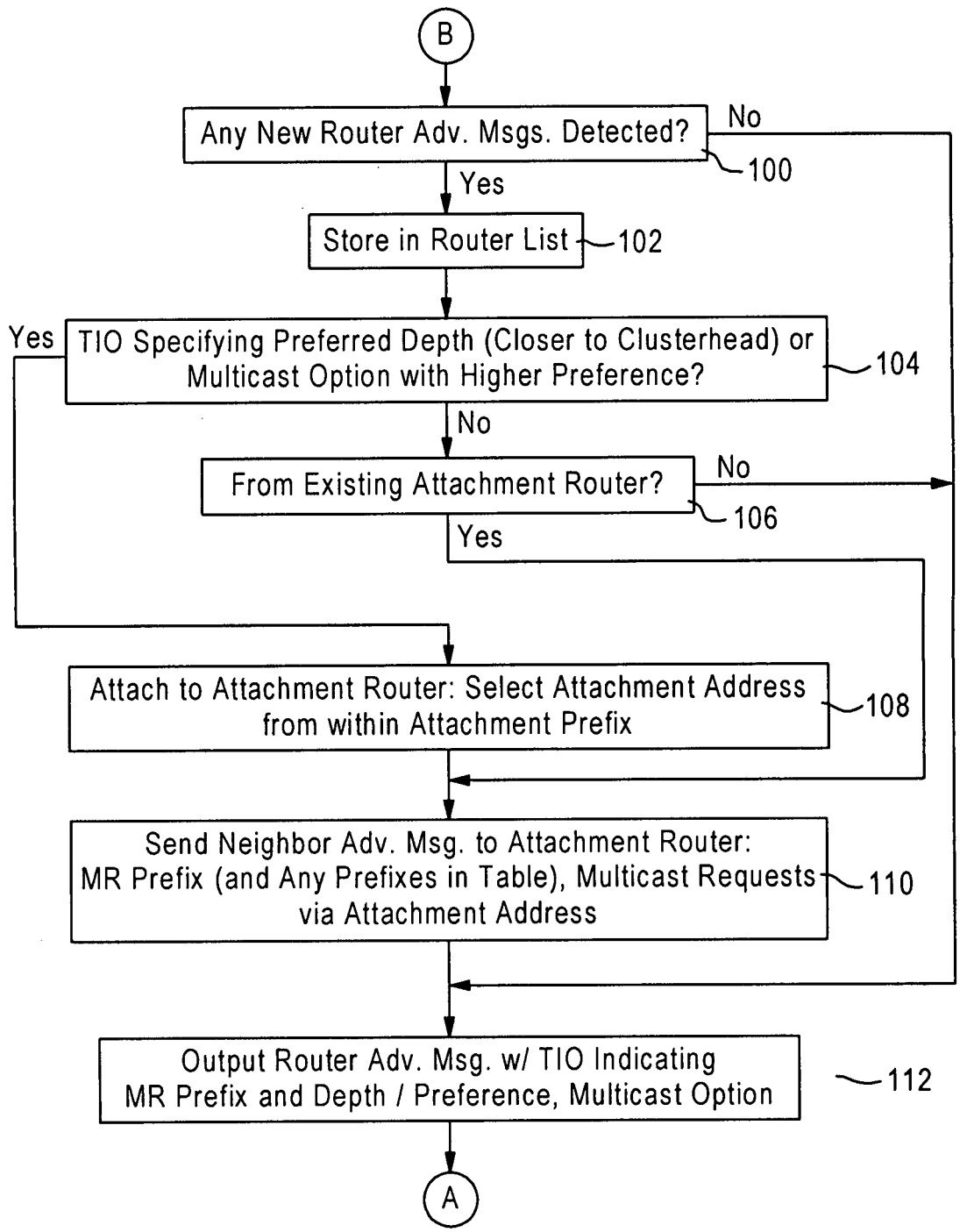
FIGS. 7A and 7B illustrate an example method by the routers of FIG. 1.
Figure 7B:
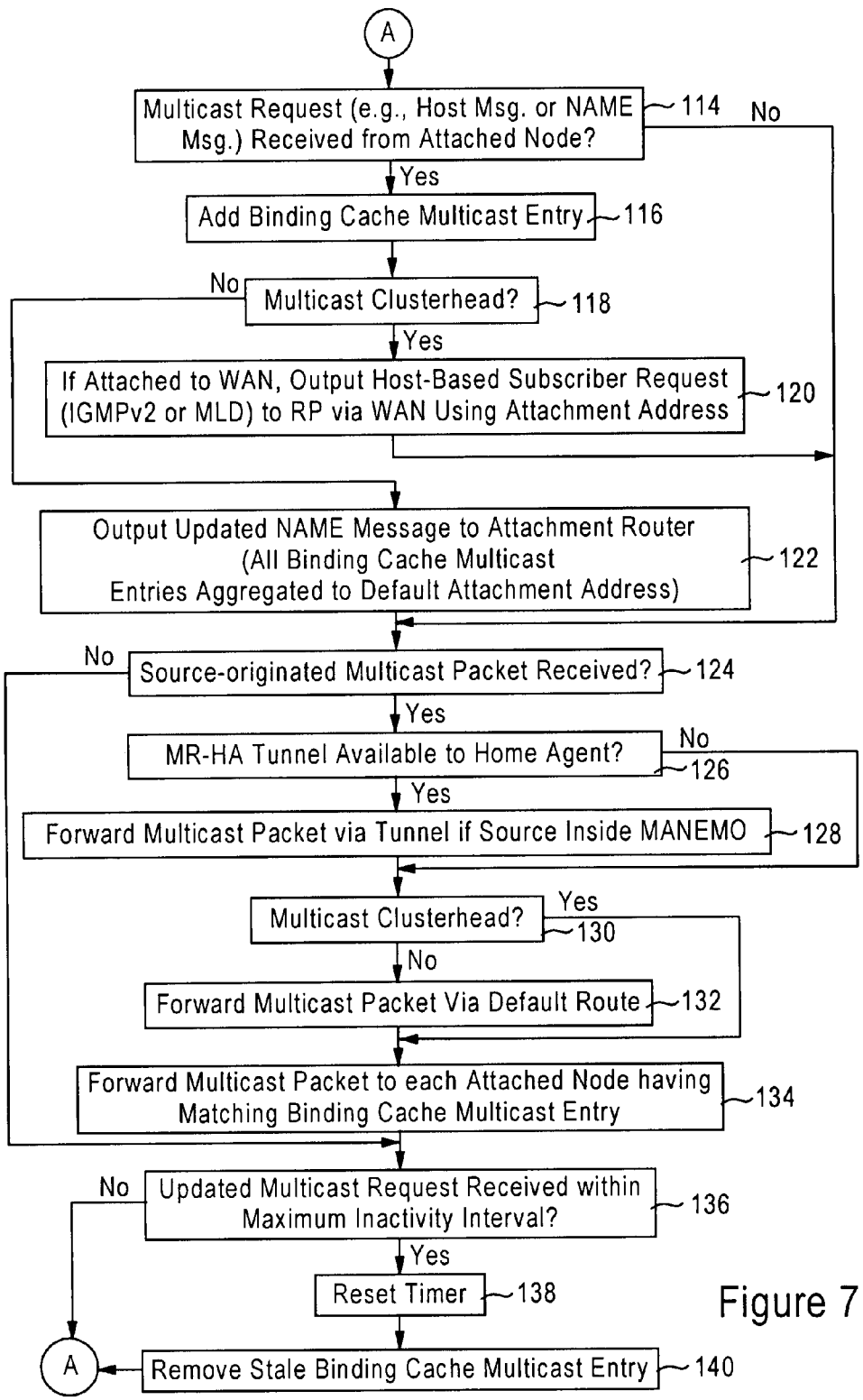

FIGS. 7A and 7B are diagrams illustrating the method of establishing a multicast-supported mobile ad hoc network by the mobile router 12 of FIG. 5, according to an example embodiment. The steps described in FIGS. 7A and 7B can be implemented as executable code stored on a computer readable medium (e.g., floppy disk, hard disk, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

It should be noted that the disclosed method is only by way of illustration, since FIG. 6 illustrates the events which would cause transmission of either a multicast-supported router advertisement message 14, or a neighbor advertisement message with multicast extension 16.

Referring to FIG. 7A, the method begins in step 100, where the attachment circuit 52 determines whether any new router advertisement message or multicast-supported router advertisement message 14 has been received. If a new router advertisement message has been received, the attachment circuit 52 stores in step 102 the router advertisement information in the default router list 55. The attachment circuit 52 determines in step 104 whether the tree information option (TIO) for the received router advertisement message 14 indicates a preferred depth closer to the clusterhead 12a, or a higher preference (e.g., relative to a multicast group 31 identified by a multicast option 67 in a received multicast-supported router advertisement message 14). If a preferred depth or higher preference is detected, the attachment circuit 52 attaches to the attachment router in step 108 by selecting a default attachment address 20 from within the attachment prefix advertised in the router advertisement message. The neighbor advertisement circuit 46 in response sends in step 110 the neighbor advertisement message with multicast extension 16 to the attachment router in accordance with event 62 of FIG. 6, specifying that the default mobile router prefix used by the mobile router, and any prefixes specified in the table, are reachable via the selected attachment address.

If in step 104 the router advertisement message does not indicate a preferred attachment router, and if in step 106 the router advertisement message with the tree information option is from the existing attachment router, the neighbor advertisement circuit 46 outputs in step 110 the neighbor advertisement message in accordance with the event 62 specified in FIG. 6.

Depending on the router state as described above with respect to event 70, the router advertisement circuit 50 outputs in step 112 the corresponding router advertisement message 14, in accordance with event 72, 74, or 76.

Referring to FIG. 7B, if in step 114 a multicast request is received from an attached node, for example a host-based multicast subscriber request 19 (e.g., an IGMPv2 request or an MLD request) from a host node 27, or a neighbor advertisement message with multicast extension (NAME) 16, the neighbor discovery circuit 44 adds in step 116 a binding cache multicast entry 75 specifying the attachment address 20 of the attached node, and any group identifier 31. In addition, if in step 118 the mobile router 12 that receives the multicast request is the multicast clusterhead 12a, the neighbor discovery circuit 44 creates and outputs in step 120 a host-based subscriber request message (e.g., an IGMPv2 or MLD message) 19 for delivery to a prescribed rendezvous point 21 via the wide area network 13.

If in step 118 the mobile router 12 that receives the multicast request is not the multicast clusterhead 12a, but rather an attached mobile router (e.g., 12b, 12c, 12d, 12e, 12f, 12g, 12h, 12i, 12j), the neighbor advertisement circuit 46 of the mobile router 12 outputs in step 122 an updated NAME message 16 to the corresponding attachment router, as illustrated in FIG. 2. As previously described, the neighbor advertisement message with multicast extension 16 specifies all the requested groups 31 that are requested via the corresponding default attachment address 20; hence, the default attachment address 20 serves as an aggregation for all the binding cache multicast entries 75 stored within the mobile router 12.

If in step 124 a source-originated multicast packet (e.g., 11) is received by the mobile router 12, the mobile router first checks to see whether access to its home agent 17 is available via the wide area network in step 126. If the home agent 17 of the mobile router 12 is available, the routing circuit 48 forwards the multicast packet 11 via its mobile router-home agent tunnel to the home agent 17 in step 128 if the source is inside the MANEMO 10 while connected to the WAN 13; if in step 130 the mobile router is not the multicast clusterhead 12a, the routing circuit 48 forwards in step 132 the multicast packets via the default route toward the attachment router. The routing circuit 48 also forwards in step 134 the multicast packet to each attached node having a matching binding cache of the cast entry 75 (except for the attached node having sent the multicast packet to the mobile router).

Hence, the root mobile router 12a acts as a proxy on behalf of the ad hoc network 10 by outputting a host-based multicast subscriber request message 19 into the wide area network 13 while connected via an access router 15. In addition, the multicast packet 11 originating in the mobile ad hoc network 10 (e.g., by the multicast source 25) can be tunneled by the mobile router 12h serving as an attachment router for the attached host multicast source 25 to its corresponding home agent 17 via its mobile router-home agent tunnel between the mobile router 12h and the home agent 17; if desired, the mobile routers 12 can be configured so that only the root mobile router 12a establishes a tunnel on behalf of the mobile router 12h to the home agent 17 of the mobile router 12h, in order to minimize the occurrence of nested tunnels within the ad hoc network 10 (tunneling to the home agent 17 of the mobile router 12h serving as the attachment router for the attached host multicast source 25 ensures the packet output by the home agent 17 is topologically correct). As such, each of the attached mobile routers can be configured to forward a multicast packet 11 via its default path toward the root mobile router, and to forward the multicast packet to any attached nodes as specified in the binding cache multicast entries 75.

As described previously, the neighbor discovery circuit 44 also monitors in step 136 whether any updated multicast requests are received within a maximum inactivity interval, for example either a host-based multicast subscriber request message within a first interval, or any neighbor advertisement message with multicast extension 16 within a shorter interval that accounts for changes in the network topology of the mobile ad hoc network 10. If an updated multicast request is not received within a maximum inactivity interval in step 136, the appropriate stale timer is reset in step 138, and the stale binding cache multicast entry is removed in step 140.

According to the example embodiments, multicast support for a mobile ad hoc network is added to neighbor advertisement messages and router advertisement messages ensuring that multicast streams can be directed to receivers within the MANET 10 with minimal interruption in service due to changes in network topology within the MANET 10. Further, the use of multicast-supported router advertisement messages and neighbor advertisement messages with multicast extensions enables the root mobile router to operate as a local rendezvous point without the necessity of existing multicasting protocols, enabling receivers within the MANET 10 to received multi cast streams from all to cast sources within the MANET 10 with minimal interruption due to changes in network topology within the MANET. In addition, the example embodiments can be implemented by the MANET 10, regardless of whether the root mobile router 12*a* has an existing connection to the wide area network 13.

What is claimed is:

1. A method comprising:
   receiving by a mobile router a multicast-supported router advertisement message from an attachment mobile router in a mobile ad hoc network, the multicast-supported router advertisement message specifying an attachment prefix and a multicast-capable identifier;
   attaching by the mobile router to the attachment mobile router in response to the multicast-capable identifier in the multicast-supported router advertisement message and according to a protocol requiring establishment in the mobile ad hoc network of a tree topology having a single multicast clusterhead, the attaching including selecting a default attachment address within an address space of the attachment prefix;
   receiving by the mobile router a host-based multicast subscriber request message, from an attached host node, for receiving a multicast stream; and
   outputting by the mobile router a neighbor advertisement message with multicast extension to the attachment mobile router in response to receiving the host-based multicast subscriber request message, the neighbor advertisement message with multicast extension specifying that access to the multicast stream is requested via the default attachment address, the mobile router not forwarding to the attachment node the host-based multicast subscriber request message received from the attached host node;
   the neighbor advertisement message with multicast extension enabling the single multicast clusterhead to create a host-based multicast subscriber request message, for transmission to a multicast source or rendezvous point via a wide area network, requesting the single multicast clusterhead receives the multicast stream as a multicast proxy host.

2. The method of claim 1, further comprising:
   outputting by the mobile router, in response to reception of the multicast-supported router advertisement message, a second multicast-supported router advertisement message specifying a second address prefix and a second multicast-capable identifier, the second address prefix owned by the mobile router and distinct from the attachment prefix;
   receiving by the mobile router a second multicast request, from a second attached node, for receiving the multicast stream; and
   adding binding cache multicast entries in the mobile router specifying the respective attached host node and the second attached node requesting the multicast stream;
   wherein the default attachment address specified in the neighbor advertisement message with multicast extension represents an aggregation in the mobile router of the multicast request and the second multicast request.

3. The method of claim 2, further comprising:
   receiving by the mobile router a multicast packet belonging to the multicast stream from an attached source node;
   forwarding the multicast packet to each corresponding attached node specified in each corresponding binding cache multicast entry;
   if the mobile router has access to a wide area network, forwarding the multicast packet by the mobile router to a prescribed home agent of the mobile router via a corresponding mobile router-home agent tunnel, the home agent reachable via the wide area network;
   if the mobile router does not have access to the wide area network, forwarding the multicast packet to the attachment mobile router via a default path to the attachment mobile router.

4. The method of claim 1, wherein
   the host-based multicast subscriber request message output by the host node is one of an IPv4 Internet Group Management Protocol (IGMP) message or a Multicast Listener Discovery (MLD) message;
   the mobile router further receiving, from an attached mobile router, a second neighbor advertisement message with multicast extension specifying that the access to the multicast stream is requested via a second attachment address within a second address prefix owned by the mobile router and distinct from the attachment prefix;
   the method further comprising adding a binding cache multicast entry in the mobile router specifying each attached node requesting the multicast stream.

5. The method of claim 1, wherein the attaching includes:
   receiving a plurality of the multicast-supported router advertisement messages from respective advertising routers;
   selecting the attachment mobile router, from among other advertising routers having output the respective multicast-supported router advertisement messages, based on the multicast-capable identifier specifying a minimum depth relative to the multicast clusterhead;
   the method further comprising outputting by the mobile router a second multicast-supported router advertisement message specifying a second address prefix and a second multicast-capable identifier, the second address prefix owned by the mobile router and distinct from the attachment prefix, the second multicast-capable identifier generated by the mobile router based on a relative position of the mobile router to the multicast clusterhead.

6. The method of claim 1, further comprising:
   receiving by the mobile router a second host-based multicast subscriber request message for receiving a second multicast stream distinct from the multicast stream requested by the attached host node;
   the outputting including aggregating within the multicast extension the request to the multicast stream, and the second multicast stream, via the default attachment address.

7. The method of claim 6, wherein the neighbor advertisement message further specifies distinct address prefixes of attached mobile routers, having attached to the mobile router, that are reachable via the default attachment address.

8. A method comprising:
   outputting by a mobile router a multicast-supported router advertisement message into a mobile ad hoc network, the multicast-supported router advertisement message specifying an attachment prefix owned by the mobile router, an identifier identifying whether a wide area network is reachable via the mobile router, and a multicast-capable identifier that identifies the mobile router as a multicast clusterhead for multicast packets according to a tree topology in the mobile ad hoc network;

receiving, by the mobile router from an attached mobile router, a first neighbor advertisement message with multicast extension specifying that access to a multicast stream is requested via a first attachment address within an address space of the attachment prefix, the mobile router not receiving any host-based multicast subscriber request message from any attached mobile router;

adding by the mobile router a first binding cache multicast entry to a binding cache in the mobile router specifying the multicast stream is requested via the first attachment address;

in response to the mobile router having access to the wide area network via an access router, the mobile router creating and sending into the wide area network to a multicast source or a rendezvous point a host-based multicast subscriber request message requesting the mobile router receives the multicast stream as a multicast proxy host on behalf of the mobile ad hoc network, including the mobile router creating the host-based multicast subscriber request message in response to the mobile router receiving the multicast extension in the first neighbor advertisement message;

if the mobile router receives a multicast packet for the multicast stream from an attached node in the mobile ad hoc network, forwarding the multicast packet to the first attachment address specified in the first binding cache multicast entry.

9. The method of claim 8, further comprising:

receiving, by the mobile router from a second attached mobile router, a second neighbor advertisement message with multicast extension specifying that access to the multicast stream is requested via a corresponding second attachment address within the address space of the attachment prefix; and adding by the mobile router second binding cache multicast entry to the binding cache specifying the multicast stream is requested via the second attachment address;

the host-based multicast subscriber request message representing an aggregation in the mobile router of the access to the multicast stream requested via the first attachment address and the second attachment address.

10. The method of claim 8, wherein:

the multicast extension within the first neighbor advertisement message further specifies at least a second multicast stream distinct from the multicast stream that is requested via the first attachment address;

the adding including adding a second binding cache multicast entry to the binding cache specifying the second multicast stream is requested via the first attachment address.

11. The method of claim 10, wherein the first neighbor advertisement message further specifies distinct address prefixes that are reachable via the first attachment address.

12. An apparatus comprising:

a network interface circuit configured for receiving a multicast-supported router advertisement message from an attachment mobile router in a mobile ad hoc network, the multicast-supported router advertisement message specifying an attachment prefix and a multicast-capable identifier, the network interface circuit further configured for receiving a host-based multicast subscriber request message, from an attached host node, for receiving a multicast stream, the apparatus implemented as a mobile router;

a multicast-supported circuit configured for attaching to the attachment mobile router in response to the multicast-capable identifier in the multicast-supported router advertisement message and according to a protocol requiring establishment in the mobile ad hoc network of a tree topology having a single multicast clusterhead, the multicast-supported circuit configured for selecting a default attachment address within an address space of the attachment prefix;

the multicast-supported circuit configured for outputting a neighbor advertisement message with multicast extension to the attachment mobile router in response to receiving the host-based multicast subscriber request message, the neighbor advertisement message with multicast extension specifying that access to the multicast stream is requested via the default attachment address, the apparatus not forwarding to the attachment node the host-based multicast subscriber request message received from the attached host node;

the neighbor advertisement message with multicast extension enabling the single multicast clusterhead to create a host-based multicast subscriber request message, for transmission to a multicast source or rendezvous point via a wide area network, requesting the single multicast clusterhead receives the multicast stream as a multicast proxy host.

13. The apparatus of claim 12, wherein:

the multicast-supported circuit is configured for outputting in response to reception of the multicast-supported router advertisement message, a second multicast-supported router advertisement message specifying a second address prefix and a second multicast-capable identifier, the second address prefix owned by the mobile router and distinct from the attachment prefix;

the multicast-supported circuit is configured for adding a binding cache multicast entry in response to the host-based multicast subscriber request message, wherein in response to receiving a second multicast request from a second attached node for receiving the multicast stream, the multicast-supported circuit is configured for adding a corresponding binding cache multicast entry specifying the attached host node and the second attached node requesting the multicast stream;

wherein the default attachment address specified in the neighbor advertisement message with multicast extension representing an aggregation in the mobile router of the multicast request and the second multicast request.

14. The apparatus of claim 13, wherein the multicast-supported circuit is configured for forwarding a multicast packet, from an attached source node, to each corresponding attached node specified in each corresponding binding cache multicast entry, wherein:

if the mobile router has access to a wide area network, the multicast-supported circuit forwards the multicast packet to a prescribed home agent of the mobile router via a corresponding mobile router-home agent tunnel via the wide area network;

if the mobile router does not have access to the wide area network, the multicast-supported circuit forwards the multicast packet to the attachment mobile router via a default path to the attachment mobile router.

15. The apparatus of claim 12, wherein:

the host-based multicast subscriber request message output by the host node is one of an IPv4 Internet Group Management Protocol (IGMP) message or a Multicast Listener Discovery (MLD) message;

the network interface circuit is configured for receiving, from an attached mobile router, a second neighbor advertisement message with multicast extension specifying that the access to the multicast stream is requested via a second attachment address within a second address prefix owned by the mobile router and distinct from the attachment prefix;

the multicast-supported circuit configured for adding a binding cache multicast entry specifying each attached node requesting the multicast stream.

16. The apparatus of claim 12, wherein the multicast-supported circuit is configured for:

receiving a plurality of the multicast-supported router advertisement messages from respective advertising routers;

selecting the attachment mobile router, from among other advertising routers having output the respective multicast-supported router advertisement messages, based on the multicast-capable identifier specifying a minimum depth relative to the multicast clusterhead;

generating and outputting a second multicast-supported router advertisement message specifying a second address prefix and a second multicast-capable identifier, the second address prefix owned by the mobile router and distinct from the attachment prefix, the second multicast-capable identifier generated by the multicast-supported circuit based on a relative position of the mobile router to the multicast clusterhead.

17. The apparatus of claim 12, wherein:

the network interface circuit is configured for receiving a second host-based multicast subscriber request message for receiving a second multicast stream distinct from the multicast stream requested by the attached host node;

the multicast-supported circuit configured for aggregating within the multicast extension the request to the multicast stream, and the second multicast stream, via the default attachment address.

18. The apparatus of claim 17, wherein the multicast-supported circuit further is configured for specifying, within the neighbor advertisement message, distinct address prefixes of attached mobile routers, having attached to the mobile router, that are reachable via the default attachment address.

19. An apparatus comprising:

a multicast-supported circuit configured for outputting a multicast-supported router advertisement message into a mobile ad hoc network, the apparatus implemented as a mobile router and the multicast-supported router advertisement message specifying an attachment prefix owned by the mobile router, the multicast-supported router advertisement message further specifying an identifier identifying whether a wide area network is reachable via the mobile router, and a multicast-capable identifier that identifies the mobile router as a multicast clusterhead for multicast packets according to a tree topology in the mobile ad hoc network;

a network interface circuit configured for receiving a first neighbor advertisement message with multicast extension specifying that access to a multicast stream is requested via a first attachment address within an address space of the attachment prefix, the apparatus not receiving any host-based multicast subscriber request message from any attached mobile router;

the multicast-supported circuit configured for adding a first binding cache multicast entry, into a binding cache, specifying the multicast stream is requested via the first attachment address, wherein:

in response to the mobile router having access to the wide area network via an access router, the multicast-supported circuit is configured for creating and sending into the wide area network to a multicast source or a rendezvous point a host-based multicast subscriber request message requesting the apparatus receives the multicast stream as a multicast proxy host on behalf of the mobile ad hoc network, including the multicast-supported circuit creating the host-based multicast subscriber request message in response to the mobile router receiving the multicast extension in the first neighbor advertisement message, and if the mobile router receives a multicast packet for the multicast stream from an attached node in the mobile ad hoc network, the multicast-supported circuit forwards the multicast packet to the first attachment address specified in the first binding cache multicast entry.

20. The apparatus of claim 19, wherein:

the network interface circuit is configured for receiving, by the mobile router from a second attached mobile router, a second neighbor advertisement message with multicast extension specifying that access to the multicast stream is requested via a corresponding second attachment address within the address space of the attachment prefix;

the multicast-supported circuit configured for adding by the mobile router second binding cache multicast entry to the binding cache specifying the multicast stream is requested via the second attachment address;

the host-based multicast subscriber request message representing an aggregation in the mobile router of the access to the multicast stream requested via the first attachment address and the second attachment address.

21. The apparatus of claim 19, wherein:

the multicast extension within the first neighbor advertisement message further specifies at least a second multicast stream distinct from the multicast stream that is requested via the first attachment address;

the multicast-supported circuit configured for adding a second binding cache multicast entry to the binding cache specifying the second multicast stream is requested via the first attachment address.

22. The apparatus of claim 21, wherein the first neighbor advertisement message further specifies distinct address prefixes that are reachable via the first attachment address.

23. An apparatus comprising:

means for receiving a multicast-supported router advertisement message from an attachment mobile router in a mobile ad hoc network, the multicast-supported router advertisement message specifying an attachment prefix and a multicast-capable identifier, the means for receiving further configured for receiving a host-based multicast subscriber request message, from an attached host node, for receiving a multicast stream, the apparatus implemented as a mobile router;

means for attaching to the attachment mobile router in response to the multicast-capable identifier in the multicast-supported router advertisement message and according to a protocol requiring establishment in the mobile ad hoc network of a tree topology having a single multicast clusterhead, the means for attaching configured for selecting a default attachment address within an address space of the attachment prefix;

the means for attaching configured for outputting a neighbor advertisement message with multicast extension to the attachment mobile router in response to receiving the host-based multicast subscriber request message, the neighbor advertisement message with multicast extension specifying that access to the multicast stream is requested via the default attachment address, the apparatus not forwarding to the attachment node the host-based multicast subscriber request message received from the attached host node;

the neighbor advertisement message with multicast extension enabling the single multicast clusterhead to create a host-based multicast subscriber request message, for transmission to a multicast source or rendezvous point via a wide area network, requesting the single multicast clusterhead receives the multicast stream as a multicast proxy host.

24. An apparatus comprising:

means for outputting a multicast-supported router advertisement message into a mobile ad hoc network, the apparatus implemented as a mobile router and the multicast-supported router advertisement message specifying an attachment prefix owned by the mobile router, the multicast-supported router advertisement message further specifying an identifier identifying whether a wide area network is reachable via the mobile router, and a multicast-capable identifier that identifies the mobile router as a multicast clusterhead for multicast packets according to a tree topology in the mobile ad hoc network;

means for receiving a first neighbor advertisement message with multicast extension specifying that access to a multicast stream is requested via a first attachment address within an address space of the attachment prefix, the apparatus not receiving any host-based multicast subscriber request message from any attached mobile router;

the means for outputting configured for adding a first binding cache multicast entry, into a binding cache, specifying the multicast stream is requested via the first attachment address, wherein:

in response to the mobile router having access to the wide area network via an access router, the means for outputting creating and sending into the wide area network to a multicast source or a rendezvous point a host-based multicast subscriber request message requesting the apparatus receives the multicast stream as a multicast proxy host on behalf of the mobile ad hoc network, including creating the host-based multicast subscriber request message in response to the mobile router receiving the multicast extension in the first neighbor advertisement message, and if the mobile router receives a multicast packet for the multicast stream from an attached node in the mobile ad hoc network, the means for outputting forwards the multicast packet to the first attachment address specified in the first binding cache multicast entry.

* * * * *